United States Patent
Kang

(10) Patent No.: US 7,292,871 B2
(45) Date of Patent: Nov. 6, 2007

(54) METHOD FOR SYNCHRONIZING MOBILE COMMUNICATION TERMINAL WITH NEIGHBOR CELL IN CALL CONNECTION STATE

(75) Inventor: Yoon-Sop Kang, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 632 days.

(21) Appl. No.: 10/289,687

(22) Filed: Nov. 7, 2002

(65) Prior Publication Data

US 2003/0087656 A1     May 8, 2003

(30) Foreign Application Priority Data

Nov. 8, 2001    (KR) ............................... 2001-69600

(51) Int. Cl.
H04B 7/00    (2006.01)
H04B 15/00    (2006.01)

(52) U.S. Cl. .................. 455/502; 455/434; 455/432.1; 455/515; 455/67.11; 370/458; 370/459; 370/350; 370/503

(58) Field of Classification Search ................ 455/434, 455/437, 432.1, 515, 67.11, 502; 370/337, 370/347, 458, 459, 350, 442, 503, 507, 509, 370/510, 512

See application file for complete search history.

(56) References Cited

U.S. PATENT DOCUMENTS

| | | | | |
|---|---|---|---|---|
| 5,940,380 A * | 8/1999 | Poon et al. | .................. | 370/330 |
| 6,067,460 A * | 5/2000 | Alanara et al. | ............. | 455/574 |
| 6,201,803 B1 * | 3/2001 | Munday et al. | ............. | 370/350 |
| 6,389,041 B1 * | 5/2002 | Morita et al. | ............... | 370/503 |
| 6,594,250 B1 * | 7/2003 | Silventoinen et al. | ....... | 370/347 |
| 7,123,593 B1 * | 10/2006 | Marque-Pucheu et al. | .. | 370/324 |
| 2001/0022791 A1 * | 9/2001 | Abdesselem et al. | ....... | 370/510 |

OTHER PUBLICATIONS

European Search Report dated Mar. 4, 2003, issued in a counterpart application, namely, Appln. No. 02025102.1.
M. Mouly et al., "The GSM System for Mobile 3 Communications", GSM System for Mobile Communications, 1993, pp. 214-215 and 334-336.

* cited by examiner

*Primary Examiner*—Matthew Anderson
*Assistant Examiner*—Sujatha Sharma
(74) *Attorney, Agent, or Firm*—The Farrell Law Firm

(57) ABSTRACT

A method for synchronizing a GSM (Global System for Mobile communication) mobile communication terminal with a neighbor cell in a call connection state the synchronization of the terminal with the neighbor cell during a time period of one frame other than transmission time periods and reception time periods.

5 Claims, 3 Drawing Sheets

METHOD FOR SYNCHRONIZING MOBILE COMMUNICATION TERMINAL WITH NEIGHBOR CELL IN CALL CONNECTION STATE

PRIORITY

This application claims priority to an application entitled "METHOD FOR SYNCHRONIZING MOBILE COMMUNICATION TERMINAL WITH NEIGHBOR CELL IN CALL CONNECTION STATE", filed in the Korean Industrial Property Office on Nov. 8, 2001 and assigned Serial No. 2001-69600, the contents of which are hereby incorporated by reference.

BACKGROUND OF THE INVENTION

1. Field of the Invention

The present invention relates to a method for synchronizing a wireless communication terminal with a neighbor cell, and more particularly to a method for rapidly synchronizing a GSM (Global System for Mobile communication) mobile communication terminal with a neighbor cell in a call connection state.

2. Description of the Related Art

It is well known in the art that a dual-band GSM mobile communication terminal or a GPRS (General Packet Radio Service) terminal is a GSM mobile communication terminal based on a GSM scheme.

The GSM mobile communication terminal can establish synchronization with a neighbor cell in a call connection state at only an idle frame of 26 multiple frames. In this regard, about 2 seconds are required for the GSM mobile communication terminal to establish synchronization with a new neighboring, even in a case where no errors occur.

FIG. 1 shows a comparison between timeslot arrangements of a serving cell and neighbor cell to illustrate a conventional method for synchronizing a GSM mobile communication terminal with the neighbor cell in a call connection state.

A TCH (Traffic CHhannel) is used to transmit speech and data signals, and includes a 26-multiframe with a length of 120 ms. Only 24 of the 26 frames are used for traffic, one is used for an SACCH (Slow Associated Control CHhannel), and the remaining one is not used. A terminal needs not perform transmission and reception at the same time since an uplink is allocated the third timeslot and a downlink is allocated a fourth timeslot in a TCH as shown in FIG. 1.

For example, in case of the second frame TCH 2, the serving cell starts reception Rx at a timeslot 0 and transmission Tx at a timeslot 3. Monitoring is then executed for measurement of power for a period of three timeslots 5 to 7.

In the neighbor cell, an FCCH (Frequency-Correction CHannel) burst is transmitted over a BCCH (Broadcasting Control CHannel).

Note that the neighbor cell is different in timing from the serving cell. In other words, as shown in FIG. 1, the timeslot 0 of the serving cell does not coincide with a timeslot 0 of the neighbor cell. Also, an FCCH burst is always transmitted at a timeslot 0 of a frequency 0 of an associated cell. That is, the FCCH burst of the neighbor cell is transmitted at the timeslot 0. At this time, the timeslot of the serving cell is at timeslot 1.

Attempting synchronization of the terminal with the neighbor cell at only the idle frame under the above condition is inefficient in that it requires a large amount of time. Later synchronization of the terminal with the neighbor cell may result in a failure in handover or an adverse effect on the quality of speech.

SUMMARY OF THE INVENTION

Therefore, the present invention has been made in view of the above problems, and it is an object of the present invention to provide a method for more rapidly synchronizing a GSM mobile communication terminal with a neighbor cell in a call connection state to prevent a handover from failing and the quality of speech from being degraded due to later synchronization of the terminal with the neighbor cell.

In accordance with the present invention, the above and other objects can be accomplished by providing a method for synchronizing a GSM (Global System for Mobile communication) mobile communication terminal with a neighbor cell in a call connection state, comprising the step of establishing synchronization of the terminal with the neighbor cell for the remaining time period of one frame other than time periods allocated for transmission and reception.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
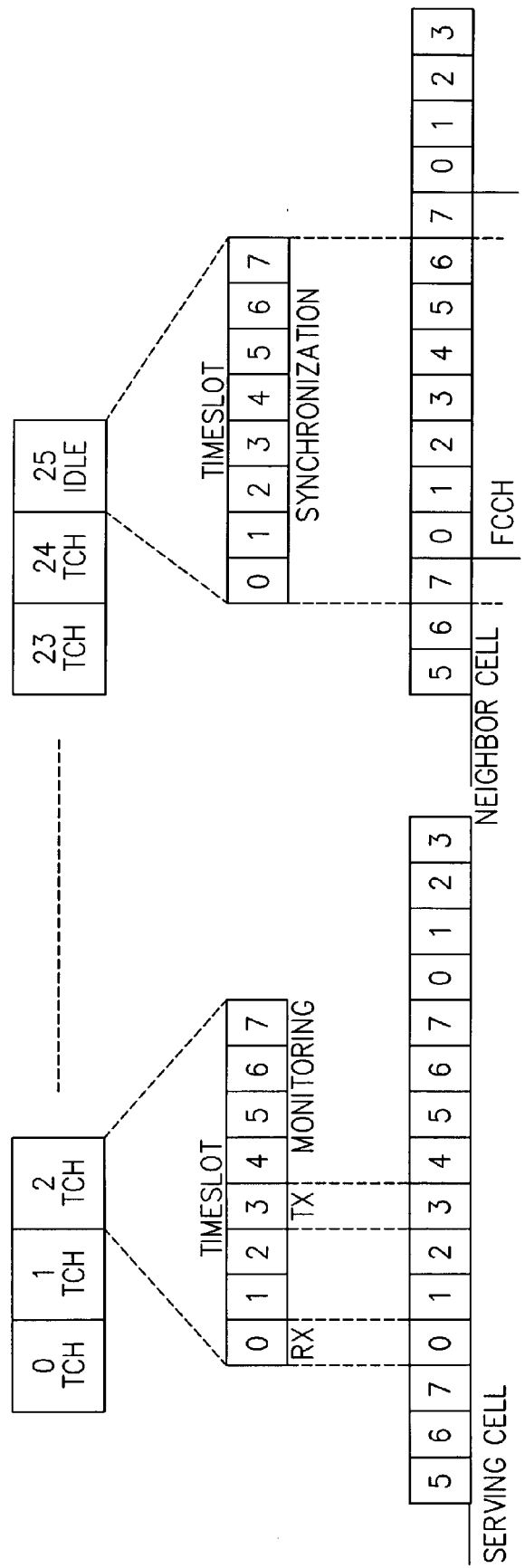
FIG. 1 is a comparison between timeslot arrangements of a serving cell and neighbor cell to illustrate a conventional method for synchronizing a GSM mobile communication terminal with the neighbor cell in a call connection state.

Now, preferred embodiments of the present invention will be described in detail with reference to the annexed drawings. In the drawings, the same or similar elements are denoted by the same reference numerals even though they are depicted in different drawings. In the following description made in conjunction with preferred embodiments of the present invention, a variety of specific elements such as constituting elements of various concrete circuits are shown. The description of such elements has been made only for a better understanding of the present invention. Those skilled in the art will appreciate that the present invention can be implemented without using the above-mentioned specific elements. In the following description of the present invention, a detailed description of known functions and configurations incorporated herein will be omitted as they will cloud the description in unnecessary detail.

Figure 2:
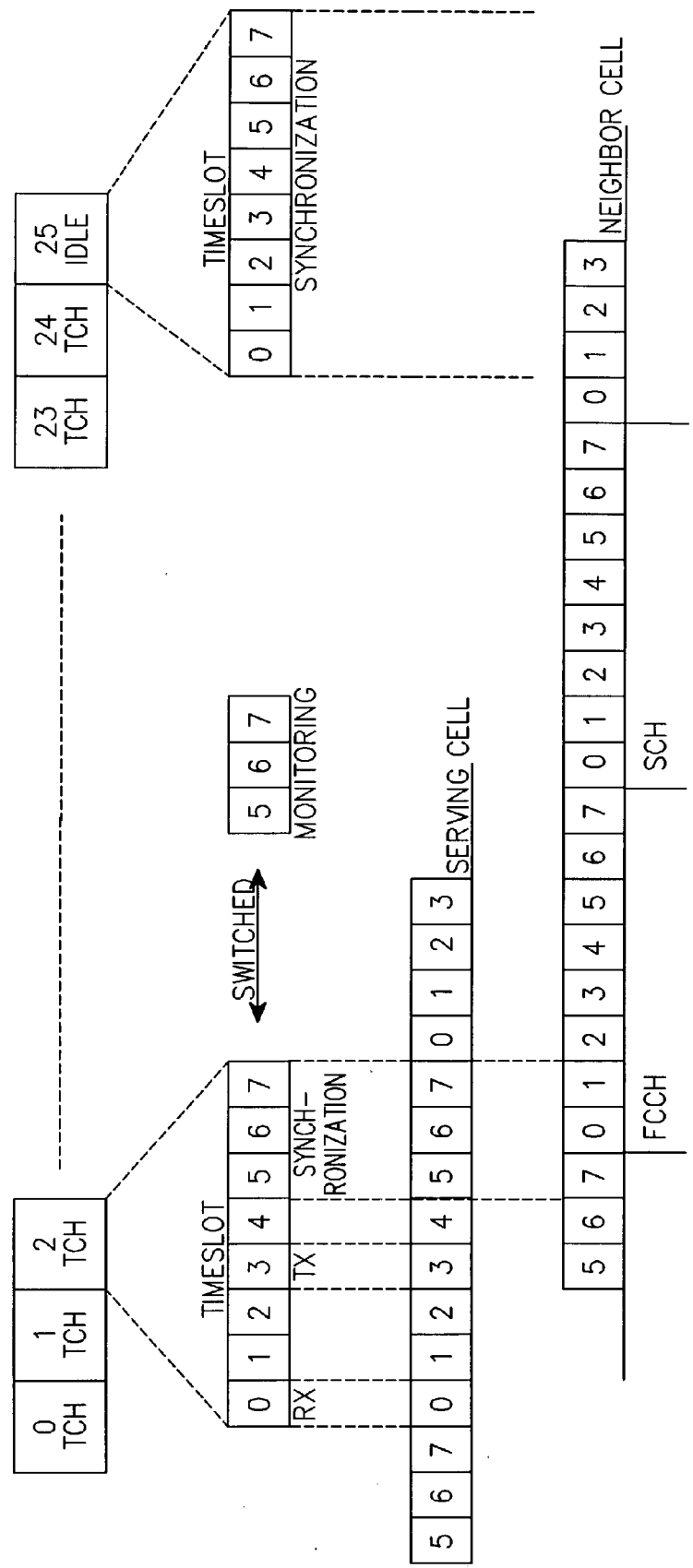
FIG. 2 is a comparison between timeslot arrangements of a serving cell and neighbor cell to illustrate a method for synchronizing a GSM mobile communication terminal with the neighbor cell in a call connection state in accordance with the present invention.

FIG. 2 is a diagram depicting a comparison between timeslot arrangements of a serving cell and neighbor cell to illustrate a method for synchronizing a GSM mobile communication terminal with the neighbor cell in a call connection state in accordance with the present invention.

As compared with the timeslot arrangements previously stated with reference to FIG. 1, a synchronization section is additionally provided to establish synchronization of the GSM mobile communication terminal with the neighbor cell for a period of three timeslots in a dedicated mode of the terminal. This synchronization section is configured in such a manner that it is switchable with a monitoring section.

Because the timing of the transmission of an FCCH burst is unknown, the mobile communication terminal in the call connection state performs an FCCH scanning operation for a period of timeslots 5, 6 and 7 to detect the FCCH burst. At this time, the probability that the FCCH burst will be detected is ⅜ths or about 37%.

One frame is composed of timeslots 0 to 7. As earlier stated neighbor cells transmit synchronization commands on a regular basis. Considering the above probability, the mobile communication terminal performs the FCCH scanning operation at the three timeslots 5, 6 and 7 upon receiving the synchronization command associated with a new neighbor cell. This scanning operation is performed for a period of 11 frames, because a BCCH containing the FCCH burst is composed of a 51-multiframe.

Upon detecting the FCCH burst or failing to detect the FCCH burst, the mobile communication terminal stops the scanning operation, and then switches timeslots 5, 6 and 7 to the monitoring operation.

In conclusion, according to the present invention, the GSM mobile communication terminal establishes synchronization with a neighbor cell in a call connection state for the remaining time period of one frame other than time periods allocated for reception Rx and transmission Tx, so as to reduce a time period required for the synchronization with the neighbor cell. The GSM mobile communication terminal further performs an FCCH scanning operation at only a desired time. Therefore, the terminal can independently switch between the monitoring operation and the FCCH scanning operation for the remaining time period other than the reception and transmission time periods.

Figure 3:
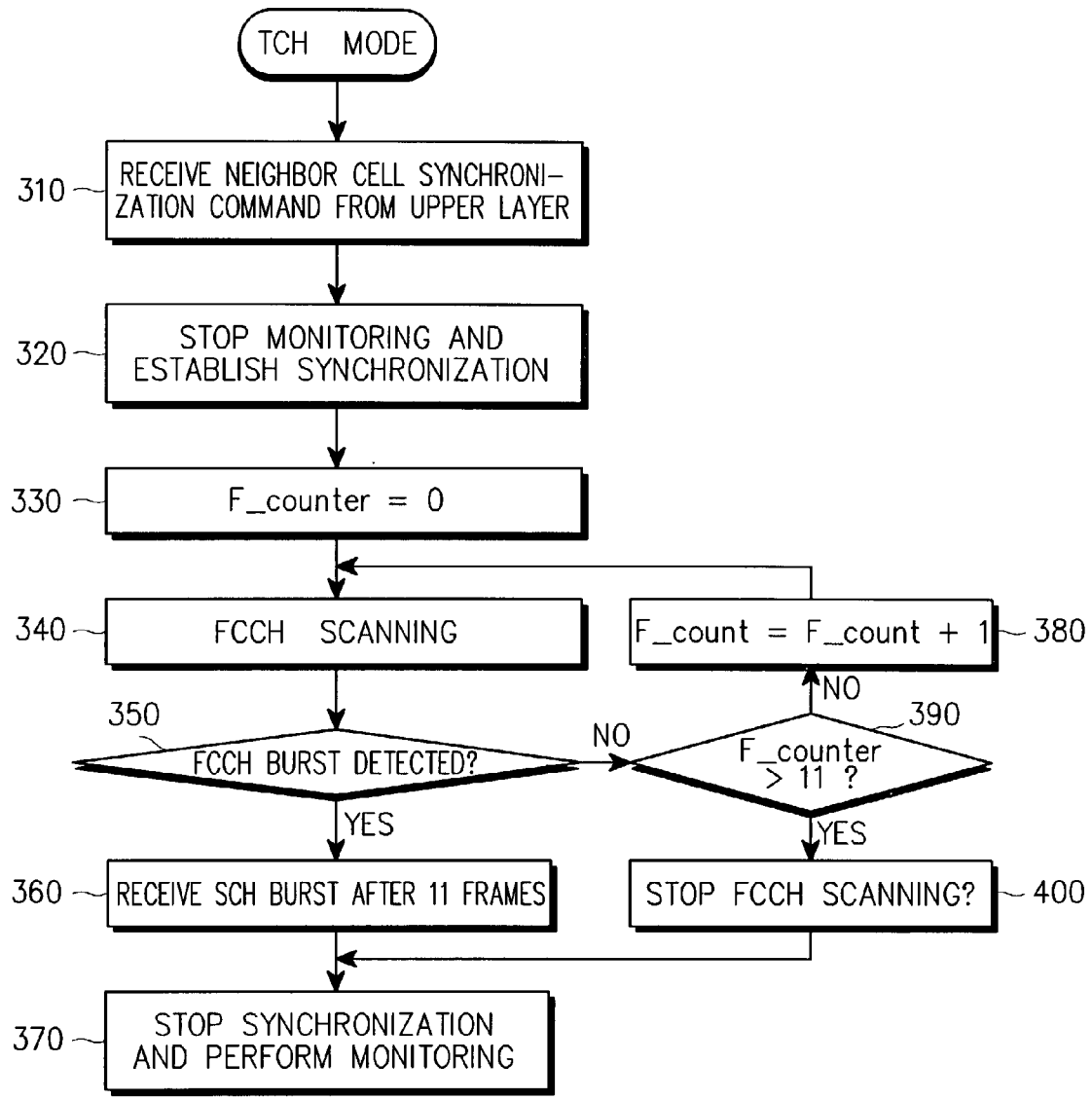
FIG. 3 is a flow chart illustrating the method for synchronizing the GSM mobile communication terminal with the neighbor cell in the call connection state in accordance with the present invention.

FIG. 3 is a flow chart illustrating the method for synchronizing the GSM mobile communication terminal with the neighbor cell in the call connection state in accordance with the present invention.

First, the GSM mobile communication terminal receives a neighbor cell synchronization command from an upper layer at step 310. Upon receiving the neighbor cell synchronization command, the terminal stops a monitoring operation, switches to synchronization operation to establish synchronization with the neighbor cell for a period of three timeslots at step 320. Thereafter, the terminal initializes a frame count F_count to 0 at step 330 and performs an FCCH scanning operation at step 340. The terminal determines at step 350 whether an FCCH burst has been detected. If the FCCH burst has been detected, the terminal receives an SCH burst after 11 frames at step 360. Subsequently, the terminal stops the synchronization and performs the monitoring operation at step 370.

In the case where it is determined at the above step 350 that no FCCH burst has been detected, the terminal determines at step 390 whether the frame count F_count is greater than 11. If the frame count F_count is determined to be greater than 11 at step 390, the terminal stops the FCCH scanning operation at step 400, and then proceeds to step 370 to stop the synchronization and perform the monitoring operation.

In the case where it is determined at the above step 390 that the frame count F_count is not greater than 11, the terminal increments the frame count F_count by one and then returns to the above step 340.

As apparent from the above description, according to the present invention, if the probability for a GSM mobile communication terminal to capture a neighbor cell in a call connection state is assumed to be about 37%, a capture time, or synchronization time, can be reduced to less than 0.5 seconds by detecting an FCCH burst within a period of 26 multiple frames. This reduction in the time period required for the synchronization with the neighbor cell can reduce handover failures, resulting in a significant reduction in call drops in the call connection state. Therefore, the terminal can have more frequent opportunities to hand over to better neighbor cells, thereby improving the overall quality of the system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for synchronizing a GSM (Global System for Mobile communication) mobile communication terminal with a neighbor cell in a call connection state, comprising the step of establishing synchronization of said terminal with said neighbor cell during a time period of a frame by performing the synchronization during timeslots previously assigned to a monitoring process, said time period being a time period other than transmission or reception time periods in the frame.

2. The method as set forth in claim 1, wherein said time period is a period of three timeslots.

3. A method for synchronizing a GSM mobile communication terminal with a neighbor cell in a call connection state, comprising the steps of:

a) determining whether a neighbor cell synchronization command from an upper layer has been received;

b) interrupting a monitoring operation and establishing synchronization of said terminal with said neighbor cell by performing the synchronization during timeslots previously assigned to the monitoring operation, upon receiving said neighbor cell synchronization command;

c) performing an FCCH scanning operation during said synchronization and determining whether an FCCH burst has been detected;

d) receiving an SCH burst if said FCCH burst has been detected and synchronizing said terminal to said SCH burst; and e) stopping said synchronization and resuming said monitoring operation.

4. The method as set forth in claim 3, wherein in step c if said FCCH burst is not detected, increasing a counter by 1 and returning to step c.

5. The method as set forth in claim 4, wherein step c further comprises the step of determining if said counter has reached a preset limit, and if said preset limit has been reached, performing step e.

* * * * *